(12) United States Patent
Suehiro

(10) Patent No.: US 7,475,518 B2
(45) Date of Patent: Jan. 13, 2009

(54) ANCHOR BOLT AND INSTALLING METHOD THEREOF

(75) Inventor: Morio Suehiro, Osaka (JP)

(73) Assignee: Suehiro-System Co., Ltd., Osaka (JP)

( * ) Notice: Subject to any disclaimer, the term of this patent is extended or adjusted under 35 U.S.C. 154(b) by 197 days.

(21) Appl. No.: 11/042,074

(22) Filed: Jan. 26, 2005

(65) Prior Publication Data

US 2005/0204643 A1 Sep. 22, 2005

Related U.S. Application Data

(62) Division of application No. 10/321,466, filed on Dec. 18, 2002.

(51) Int. Cl.
*E04B 1/00* (2006.01)

(52) U.S. Cl. .......................... 52/745.21; 52/295; 52/704

(58) Field of Classification Search .................. 52/698, 52/699, 745.2, 509, 295, 169.9, 263, 704, 52/706, 707, 294, 296, 297, 395, 514, 514.5, 52/700, 701, 745.15, 745.21; 411/383, 384, 411/385; 405/259.1, 259.5, 259.6
See application file for complete search history.

(56) References Cited

U.S. PATENT DOCUMENTS

| | | | |
|---|---|---|---|
| 642,377 A | 1/1900 | Smith | |
| 862,355 A | 8/1907 | Stoneburner | |
| 2,540,622 A | 2/1951 | Langenberg | |
| 2,879,660 A * | 3/1959 | Reintjes | 52/509 |
| 2,927,496 A * | 3/1960 | Goodman | 411/383 |
| 3,125,765 A | 3/1964 | Fay | |
| 3,201,906 A * | 8/1965 | Giardina | 52/39 |
| 4,038,801 A * | 8/1977 | Busch | 52/698 |
| 4,250,681 A * | 2/1981 | Helderman | 52/704 |
| 4,438,607 A | 3/1984 | Nelson | |
| 4,458,463 A * | 7/1984 | Behrend | 52/295 |
| 4,473,984 A | 10/1984 | Lopez | |
| 4,632,346 A * | 12/1986 | Wilson | 248/188.4 |
| 5,251,993 A | 10/1993 | Sigourney | |

(Continued)

FOREIGN PATENT DOCUMENTS

JP S61-2550 9/1986

(Continued)

*Primary Examiner*—Richard E Chilcot, Jr.
*Assistant Examiner*—William V Gilbert
(74) *Attorney, Agent, or Firm*—Oliff & Berridge, PLC

(57) ABSTRACT

It is an object of the present invention to make it possible to install an anchor bolt while securing the pull-out strength of the anchor bolt even when the anchor bolt installation position encounters a reinforcement in concrete. An anchor bolt according to the present invention includes a first anchor bolt 2 having an embedded portion shorter than a reinforcement covering margin, a second anchor bolt 7 having an axis at a position deflected from an axis of the first anchor bolt 2, and a coupling member 5 integrally fixing the first anchor bolt 2 and the second anchor bolt 7. Further, in an installing method of an anchor bolt according to the present invention, when a first anchor hole bored at the anchor bolt installation position encounters a reinforcement, a second anchor hole is bored at a position in a direction other than the arrangement direction of the encountered reinforcement, to thereby install the anchor bolt according to the present invention.

12 Claims, 15 Drawing Sheets

U.S. PATENT DOCUMENTS

| | | | |
|---|---|---|---|
| 5,548,939 A * | 8/1996 | Carmical | 52/707 |
| 5,724,772 A | 3/1998 | McGill | |
| 5,826,387 A * | 10/1998 | Henderson et al. | 52/295 |
| 6,367,205 B2 | 4/2002 | Cornett | |

FOREIGN PATENT DOCUMENTS

| | | |
|---|---|---|
| JP | 02-37944 | 3/1990 |
| JP | 04-047027 | 2/1992 |
| JP | 09-003912 | 1/1997 |
| JP | 10-89334 | 4/1998 |
| JP | 2001-107471 | 4/2001 |

* cited by examiner

_US 7,475,518 B2_

ANCHOR BOLT AND INSTALLING METHOD THEREOF

CROSS-REFERENCE TO RELATED APPLICATION

This application is a divisional application of application Ser. No. 10/321,466, filed Dec. 18, 2002, the entirety of which is incorporated herein by reference.

BACKGROUND

1. Field of the Invention

The present invention relates to an anchor bolt for use in installing an anchor on a concrete floor surface, a wall surface, a ceiling surface, and so on and to an installing method thereof.

2. Description of Related Art

Anchors to be installed after a concrete frame is matured are classified into adhesive anchors and driving anchors, and both of them include various kinds. FIG. 20 to FIG. 24 show an installing example of the adhesive anchor. In this installation example, an anchor hole 11 is first bored in a concrete frame 9 as shown in FIG. 20. Next, the anchor hole 11 is cleaned with a specialized brush 25 as shown in FIG. 21, and a capsule 15 in which an adhesive is encapsulated is embedded therein as shown in FIG. 22. Then, as shown in FIG. 23, an anchor bolt 18 is screwed in to stir the adhesive while destructing the capsule 15. Thereafter, as shown in FIG. 24, the adhesive is cured to bond the anchor bolt 18 and the concrete frame 9 so that the installation of the anchor bolt 18 is finished. Incidentally, depending on the kind of the adhesive, such a method is also available that an anchor bolt is driven in by a hammer, instead of being screwed in, to mix an adhesive while destructing an adhesive capsule, thereby fixing the anchor bolt.

The biggest problem of such an anchor installation is that a designed installation position of the anchor sometimes encounters the position of a reinforcement arranged in the concrete frame to obstruct the installation of the anchor bolt. Specifically, in order to secure the pull-out strength of the anchor bolt, a predetermined embedded length is required in the concrete frame. However, since the reinforcement is generally arranged in the depth of about 30 mm to about 60 mm from the surface of the concrete frame, the predetermined embedded length of the anchor bolt cannot be secured when the anchor hole encounters this reinforcement (this does not apply to the case when the predetermined embedded length is shorter than a reinforcement covering margin which will be explained next).

This will be explained referring to FIG. 25. Note that this drawing shows a cross section of the concrete frame 9 and the reference numeral 26 in this drawing denotes the surface of the concrete frame 9. A distance F from a reinforcement 12 to the surface 26 of the concrete frame 9 corresponds to the reinforcement covering margin. In FIG. 25, an anchor hole D does not encounter the reinforcement 12 so that a predetermined embedded length L can be secured for the anchor bolt 18. On the other hand, an anchor hole E encounters the reinforcement 12 so that the predetermined embedded length cannot be secured for the anchor bolt 18.

In order to solve this problem, an anchor hole inclining by about 30° from a direction perpendicular to the frame surface 26 is first bored at the anchor bolt installation position and the anchor bolt 18 is driven thereinto, as shown in FIG. 26. Next, as shown in FIG. 27, a force is given to the anchor bolt 18 protruding outside the concrete frame to bend the anchor bolt 18 in the direction perpendicular to the frame surface 26. By this method, the anchor bolt 18 is installed while evading the reinforcement 12.

The above-described installing method of the anchor bolt, however, gives rise to various problems such that the anchor bolt tends to be deviated from the installation position since it is driven in the inclined state, and that the bending work deforms the anchor bolt to lower the strengthen thereof. Therefore, a high degree of skill is required for carrying out the above-described installing method of the anchor bolt.

Incidentally, the anchor bolt having a bolt diameter of M16 or shorter can be manually bent, but it is difficult to bend the anchor bolt having a diameter of M20 or longer manually. So, when the bolt diameter is M20 or longer, the reinforcement encountered by the anchor hole is cut by a diamond cutter to bore an anchor hole to a predetermined depth, thereby installing the anchor bolt. In this case, however, there is such a problem that strength degradation of the concrete frame cannot be avoided since the reinforcement is cut.

SUMMARY

It is an object of the present invention to provide an anchor bolt which can be installed without any change in its installation position even when an anchor hole for installing an anchor encounters a reinforcement in a concrete frame, and to provide an installing method thereof. It is another object of the present invention to provide an anchor bolt for which the pull-out strength can be secured and an installing method thereof.

An anchor bolt according to the present invention is characterized in that it comprises a fixing shaft portion protrudingly installed outside a concrete frame and an embedded portion embeddedly installed in the concrete frame, an axis of the fixing shaft portion and an axis of the embedded portion being deflected from each other. Incidentally, such a structure may also be adopted that the fixing shaft portion has a coaxial embedded portion formed to extend coaxially and a length of this coaxial embedded portion is shorter than a reinforcement covering margin.

Further, a fixing shaft portion protrudingly installed outside a concrete frame and an embedded portion embeddedly installed in a concrete frame are in a bent shape to form a bent portion, thereby causing an axis of the fixing shaft portion and an axis of the embedded portion to be deflected from each other while being set in parallel to each other. The bending angle of the bent portion is preferably set at 45 degrees to 60 degrees relative to the axis of the fixing shaft portion or the axis of the embedded portion. Further, the bent portion allows a reinforcing piece to be attached thereto.

The coaxial embedded portion is inserted into an anchor hole encountering the reinforcement so that a fixing screw portion can be arranged at an anchor bolt installation position. Consequently, the anchor bolt can be installed without any change in the installation position thereof. Further, a second anchor hole is bored in the vicinity of the anchor hole encountering the reinforcement and the deflected embedded portion is inserted into this second anchor hole so that an embedded length can be secured. This makes it possible to secure the pull-out strength of the anchor bolt.

Further, the present invention is an anchor bolt characterized in that it comprises a first anchor bolt having an embedded portion shorter than the reinforcement covering margin, a second anchor bolt having an axis at a position deflected from an axis of the first anchor bolt, and a coupling member for integrally fixing the first anchor bolt and the second anchor bolt.

In this case, the embedded portion of the first anchor bolt is inserted into the anchor hole encountering the reinforcement so that the fixing screw portion can be arranged at the anchor bolt installation position. Consequently, the anchor bolt can be installed without any change in its installation position. Further, the second anchor hole is bored in the vicinity of the anchor hole encountering the reinforcement and an embedded portion of the second anchor bolt is inserted into this second anchor hole so that the embedded length can be secured. This makes it possible to secure the pull-out strength of the anchor bolt.

The embedded portion of the second anchor bolt may be formed to be longer than the embedded portion of the first anchor bolt. This can enhance the pull-out strength of the anchor bolt.

The second anchor bolt may also be so structure that it is formed only of the embedded portion which is embeddedly installed in the concrete frame and does not have the fixing screw portion which is protrudingly installed outside the concrete frame. This structure makes it possible to avoid the interference between an object to be attached on the surface of the concrete frame and the second anchor bolt.

Such a structure may also be adopted that the first anchor bolt is screwed into the coupling member so that a length of the embedded portion of the first anchor bolt is adjustable. Further, a thread portion may be formed on the entire surface of an outer periphery of the first anchor bolt. This makes it possible to install the anchor bolt to any concrete frame.

Such a structure is also adoptable that the distance between the axis of the first anchor bolt and the axis of the second anchor bolt is about 30 mm to about 150 mm. In this case, the second anchor bolt can secure a necessary length without encountering the reinforcement so that the pull-out length of the anchor bolt can be secured.

A horizontal cross section of the coupling member may be in a rectangular shape. Alternatively, the shape of the horizontal cross section of the coupling member may also be a semicircle with a flat surface thereof being a surface along the surface of the concrete frame. The horizontal cross section of the coupling member may also be in a circular shape.

The first anchor bolt, the second anchor bolt, and the coupling member may be integrally formed. Further, a thread portion may be formed on the entire surface of an outer periphery of the anchor bolt. This can reduce production cost of the anchor bolt.

Moreover, the plurality of second anchor bolts may be provided in the vicinity of the first anchor bolt. This makes it possible to secure the pull-out strength of the anchor bolt.

The embedded portion(s) of the first anchor bolt and/or the second anchor bolt may be in a round bar or a reinforcement shape.

An installing method of an anchor bolt according to the present invention is an installing method of an anchor bolt characterized in that it comprises the steps of: in a case when an anchor bolt installation position in a concrete frame encounters a reinforcement, boring an anchor hole at a peripheral position of a position encountering the reinforcement; and embedding in the anchor hole an embedded portion whose axis is deflected from an axis of a fixing shaft portion disposed at the position encountering the reinforcement and which is integrally coupled to the fixing shaft portion, thereby fixedly installing the anchor bolt. Incidentally, the second anchor hole may be bored at a position in a direction other than an arrangement direction of the reinforcement encountered by the first anchor hole. When a groove is formed between the position encountering the reinforcement and the anchor hole formed in the deflected position, the coupling member between the fixing shaft portion and the deflected embedded portion can be accommodated in the groove.

An installing method of an anchor bolt according to another aspect of the present invention is characterized in that, it comprises the steps of: when an anchor bolt installation position in a concrete frame encounters a reinforcement, boring a first anchor hole having a depth within a reinforcement covering margin at the position encountering the reinforcement, boring a second anchor hole having a depth equal to or longer than the reinforcement covering margin at a peripheral position not encountering the reinforcement, and fixedly inserting into these anchor holes embedded portions of a first and a second anchor bolt which are integrally formed by the coupling member, thereby installing the anchor bolt.

An installing method of an anchor bolt according to still another aspect of the present invention is characterized in that it comprises the steps of: when an anchor hole bored in a concrete frame encounters a reinforcement, discriminating a position not encountering the reinforcement based on an arrangement direction of the encountered reinforcement to bore a second anchor hole having a depth longer than a reinforcement covering margin, forming a communicating groove between the first anchor hole and the second anchor hole, embeddedly installing the first anchor bolt and the second anchor bolt in the first anchor hole and the second anchor hole respectively while accommodatingly installing in the groove the coupling member which couples these anchor bolts, and supporting the first anchor bolt by the second anchor bolt.

FIG. 1 shows how reinforcements are arranged in a concrete floor surface. In the case of a concrete floor surface in general use, reinforcements 12 are arranged in the concrete frame on a grid. Note that the diameter of the reinforcement is about 10 mm to about 22 mm, and the pitch between the reinforcements is about 100 mm to about 250 mm. When an anchor hole is bored without any knowledge of an accurate position of the reinforcement, the anchor hole sometimes encounters the reinforcement. Each black circle in FIG. 1 indicates the position where a first anchor hole encounters the reinforcement. The first anchor hole encounters the reinforcement in three patterns, namely, A, B, and C in FIG. 1. A is a case where the reinforcement arranged in a north-south direction is encountered, B is a case where the reinforcement arranged in an east-west direction is encountered, and C is a case where a crossing part of the reinforcement arranged in the north-south direction and the reinforcement arranged in the east-west direction is encountered.

Here, by peering from a bottom portion of the first anchor hole, the arrangement direction of the encountered reinforcement can be seen. In other words, it can be discriminated in which pattern of A, B, and C the reinforcement is encountered. Then, when the second anchor hole is bored at a predetermined distance of X apart from the first anchor hole in a direction other than the arrangement direction of the encountered reinforcement, the second anchor hole does not encounter the reinforcement. Incidentally, the direction other than the arrangement direction of the encountered reinforcement is the east-west direction in the A pattern, the north-south direction in the B pattern, and a north-east direction, a north-west direction, a south-east direction, or a south-west direction in the C pattern. Further, the aforesaid distance X may be any as long as it is equal to or shorter than the pitch of the reinforcement. When the second anchor hole is bored in such a position as a rule, it becomes possible to bore the second anchor hole having a necessary depth, which makes it possible to secure the pull-out strength of the anchor bolt.

DETAILED DESCRIPTION OF EMBODIMENTS

A preferred embodiment of an anchor bolt according to the present invention and an installing method thereof will be explained in detail with reference to the attached drawings. It should be noted that the description to follow only illustrates modes of the embodiment of the present invention and the present invention is not limited to these modes.

Figure 2:
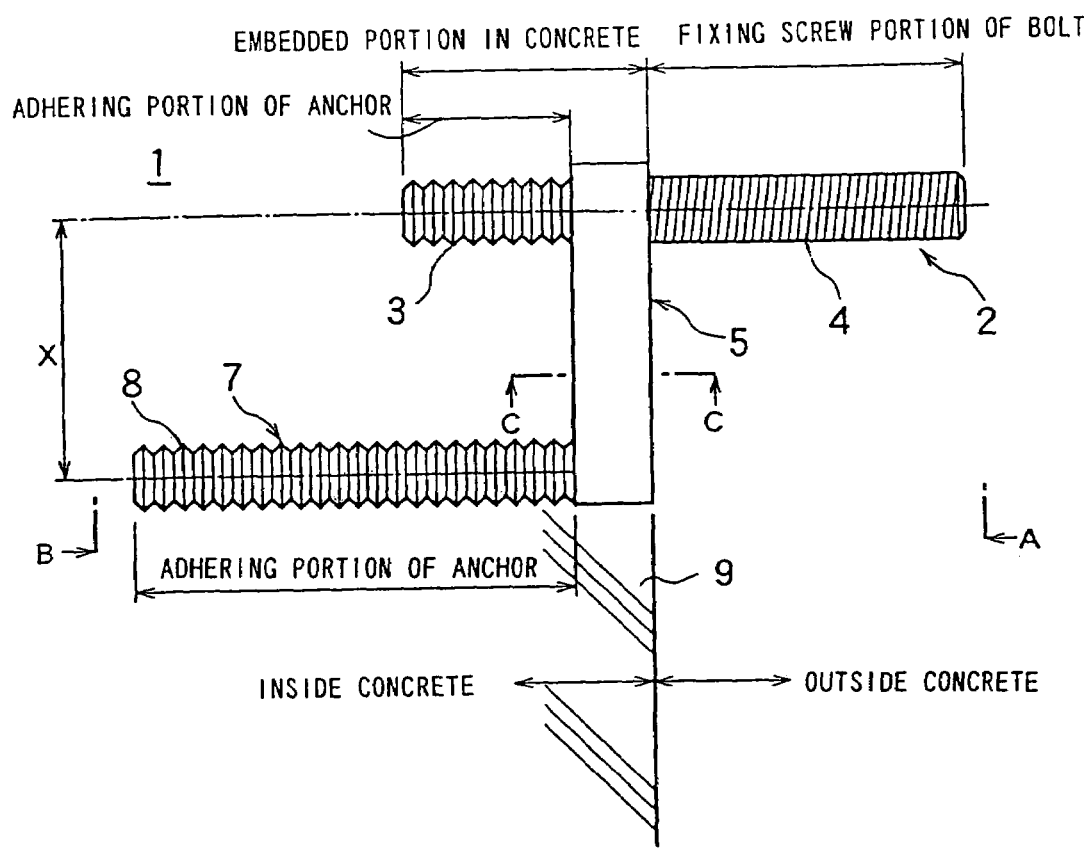
FIG. 2 is a plan view of the anchor bolt according to the embodiment.
Figure 5:
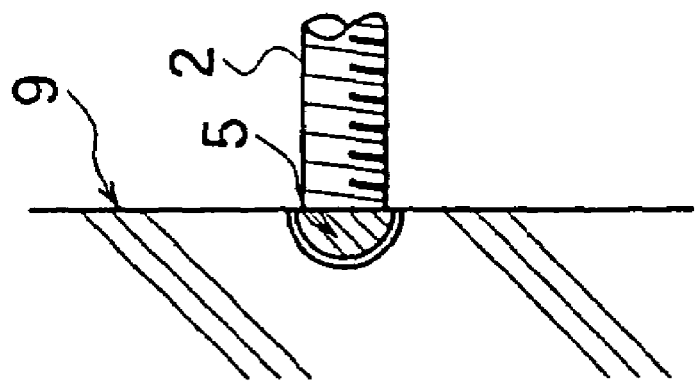
FIG. 5 is a sectional view taken along the C-C line in FIG. 2.
Figure 4:
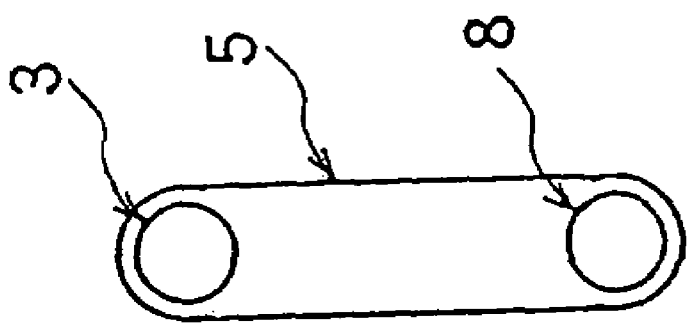
FIG. 4 is a sectional view taken along the B line in FIG. 2.
Figure 3:
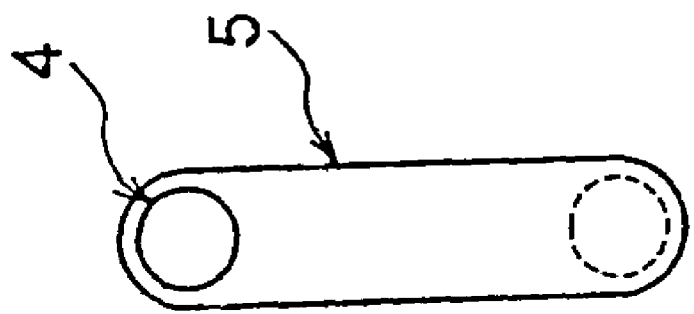
FIG. 3 is a sectional view taken along the A line in FIG. 2.

FIG. 2 to FIG. 5 show explanatory views of the anchor bolt according to this embodiment. Note that FIG. 2 is a plan view, FIG. 3 is a sectional view taken along the A-line in FIG. 2, FIG. 4 is a sectional view taken along the B-line in FIG. 2, and FIG. 5 is a sectional view taken along the C-C line in FIG. 2. The anchor bolt according to this embodiment includes a first anchor bolt 2 having an embedded portion shorter than a reinforcement covering margin, a second anchor bolt 7 having an axis at a position deflected from the axis of the first anchor bolt 2, and a coupling member 5 for integrally fixing the first anchor bolt 2 and the second anchor bolt 7.

The first anchor bolt 2 and the second anchor bolt 7 are formed of materials such as SS400, stainless steel, aluminum, cast iron, SCS, and so on.

The first anchor bolt 2 has a fixing screw portion 4 protrudingly installed outside a concrete frame 9 and an embedded portion 3 embeddedly installed in the concrete frame 9. The fixing screw portion 4 and the embedded portion 3, which are arranged coaxially, can also be formed integrally of a bar material. A male screw is formed on an outer periphery of the fixing screw portion 4, and the embedded portion, 3 is in a round bar shape or a reinforcement shape. Incidentally, when the surface of the outer periphery of the embedded portion 3 is made irregular by a male screw or the like, the pull-out strength of the first anchor bolt 2 can be enhanced. The embedded portion 3 of the first anchor bolt 2 is formed to be shorter than the reinforcement covering margin. The reinforcement covering margin is a distance from the reinforcement to the surface of the concrete frame 9. In boring an anchor hole in the concrete frame 9, even when a predetermined depth cannot be secured due to its encounter with the reinforcement, the embedded portion 3 of the first anchor bolt 2 is inserted into this anchor hole to enable the installation of the anchor bolt 1 according to this embodiment. This makes it possible to arrange the fixing screw portion 4 of the first anchor bolt 2 at an anchor bolt installation position.

Figure 13:
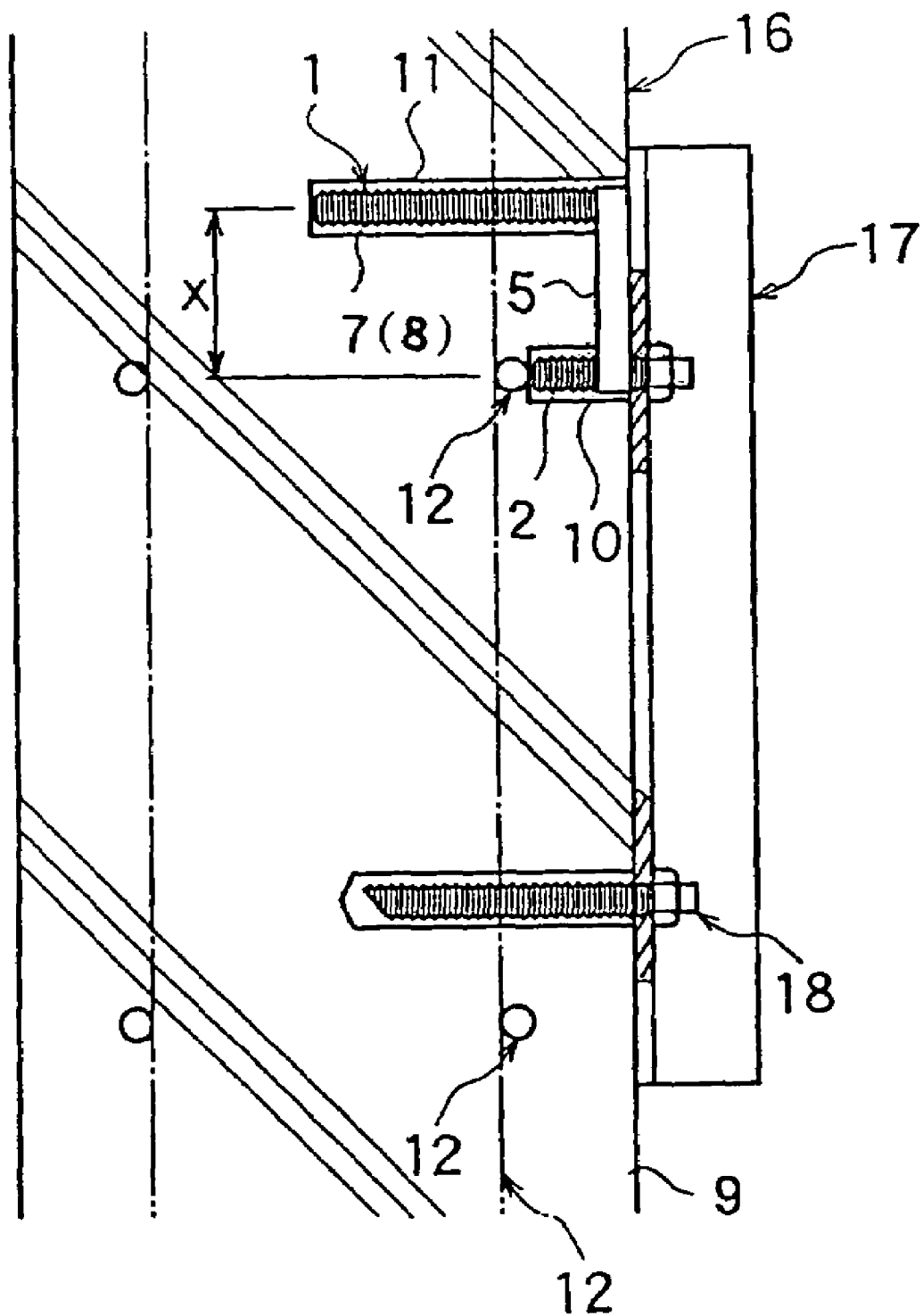
FIG. 13 is a side sectional view showing a usage example of the anchor bolt according to the embodiment when it is installed in a concrete wall surface.

Meanwhile, the second anchor bolt 7 having an axis at a position deflected from the axis of the first anchor bolt 2 is formed. The second anchor bolt 7 is formed only of an embedded portion 8 which is embeddedly installed in the concrete frame 9, and does not have a fixing screw portion protrudingly installed outside the concrete frame 9. This makes it possible to avoid the interference between a support angle 17 attached on the surface of the concrete frame 9 and the second anchor bolt 7 as shown in FIG. 13. The embedded portion 8 of the second anchor bolt 7 is also formed in a round bar shape or a reinforcement shape. Incidentally, when the surface of the outer periphery of the embedded portion 8 is made irregular by a male screw or the like, the pull-out strength of the second anchor bolt 7 can be enhanced. The second anchor bolt 7 is so arranged that the axis thereof is deflected from and parallel to the axis of the first anchor bolt 2.

Incidentally, the pull-out strength of an anchor bolt is proportional to the adhesive strength between the anchor bolt and the concrete frame. This adhesive strength is calculated from the surface area of the anchor bolt mainly in an adhering portion multiplied by the adhesive strength per unit area. This means that the longer the length of the adhering portion is, the bigger the adhesive strength becomes. It is difficult to secure a predetermined adhesive strength of the aforesaid first anchor bolt 2 since the embedded portion 3 thereof shorter than the reinforcement covering margin is made to adhere to the anchor hole and accordingly, the surface area of the adhering portion becomes small. However, when the embedded portion 8 of the second anchor bolt 7 is formed to be sufficiently long and made to adhere to the second anchor hole, the surface area of the adhering portion is increased, which makes it possible to secure the predetermined adhesive strength. Consequently, the pull-out strength of the anchor bolt 1 according to this embodiment can be secured. Incidentally, when the length of the embedded portion 8 of the second anchor bolt 7 is formed to be longer than the reinforcement covering margin, the pull-out strength of the anchor bolt 1 according to this embodiment can be enhanced.

Meanwhile, the coupling member 5 integrally fixing the first anchor bolt 2 and the second anchor bolt 7 is formed. The coupling member 5 is formed of a metal material and so on in a bar shape. As shown in FIG. 5, the shape of a horizontal cross section of the coupling member 5 is a semicircle, a flat surface thereof being a surface along the surface of the concrete frame 9. Incidentally, it may be a rectangle or a circle other than the semicircle. Then, the first anchor bolt 2 and the second anchor bolt 7 are fixed to both ends in a longitudinal direction of the coupling member 5, respectively. This results in such an arrangement that the axis of the first anchor bolt and the axis of the second anchor bolt are deflected from each other. Note that a distance X between the axis of the first anchor bolt 2 and the axis of the second anchor bolt 7 is determined by a method described later.

Figure 6:
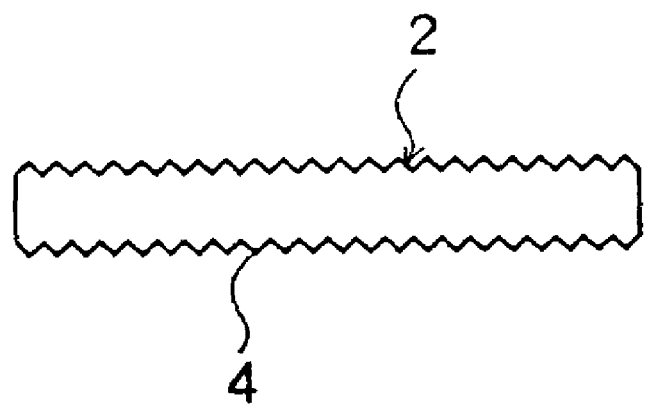
FIG. 6 is a side sectional view of a first anchor bolt in a modification example of the anchor bolt according to the embodiment.
Figure 7:
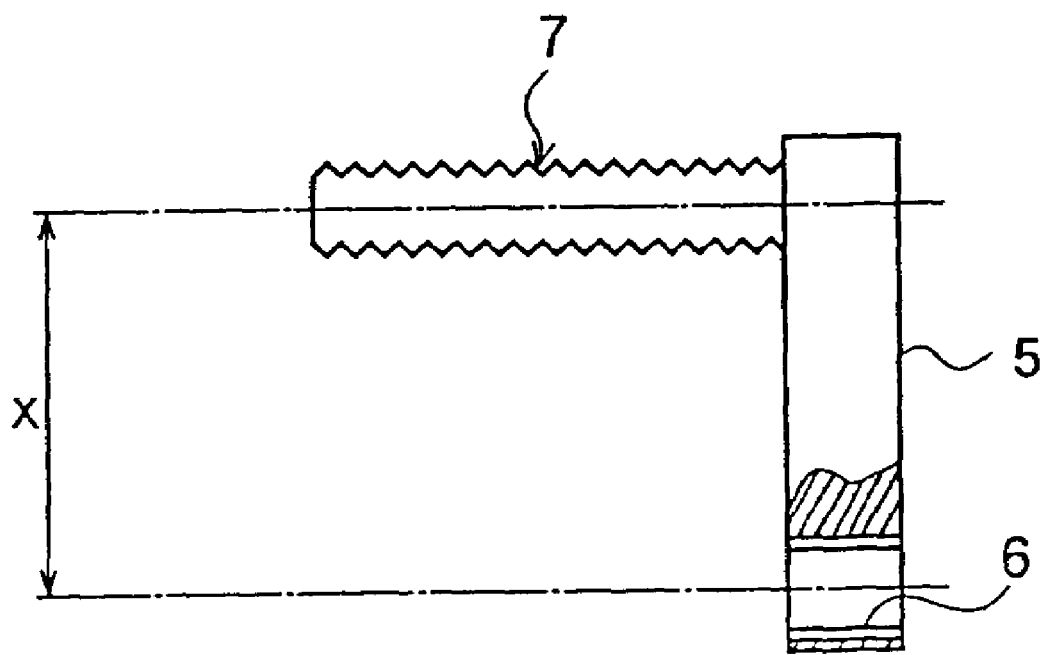
FIG. 7 is a side sectional view of a coupling member and a second anchor bolt in a first modification example of the anchor bolt according to the embodiment.

Incidentally, a female screw may be formed on the portion of the coupling member 5 to which the first anchor bolt 2 is fixed to have the fixing screw portion 4 of the first anchor bolt 2 screwed thereto. In this case, the ratio in length between the fixing screw portion 4 and the embedded portion 3 in the first anchor bolt 2 is freely adjustable. Alternatively, a male screw may be formed on the entire surface of the first anchor bolt 2 from the fixing screw portion 4 to the embedded portion 3 to have the first anchor bolt 2 screwed to the coupling member 5. In the first anchor bolt 2 shown in FIG. 6, a male screw 4 is formed on the entire surface of the outer periphery. Meanwhile, at the end of the coupling member 5 shown in FIG. 7, a female screw 6 screwedly fitted to the male screw of the first anchor bolt 2 is formed. When the first anchor bolt 2 shown in FIG. 6 is screwed to the coupling member 5 shown in FIG. 7 to form the anchor bolt 1 according to this embodiment, the ratio between the fixing screw portion 4 and the embedded portion 3 in the first anchor bolt 2 is freely adjustable. Such a structure that the second anchor bolt 7 (formed only of the embedded portion) is thus fixedly attached to the coupling member 5 in advance and the first anchor bolt 2 is screwed to the coupling member 5 can provide an advantage of facilitating the adjustment on the construction site to a great extent. Of course, such structures may be adopted that the first anchor bolt 2 and the coupling member 5 are integrated in advance and the second anchor bolt 7 is later connected thereto and that the first and second anchor bolts 2, 7 are formed separately from the coupling member 5 respectively and they are integrally coupled later.

Figure 1:
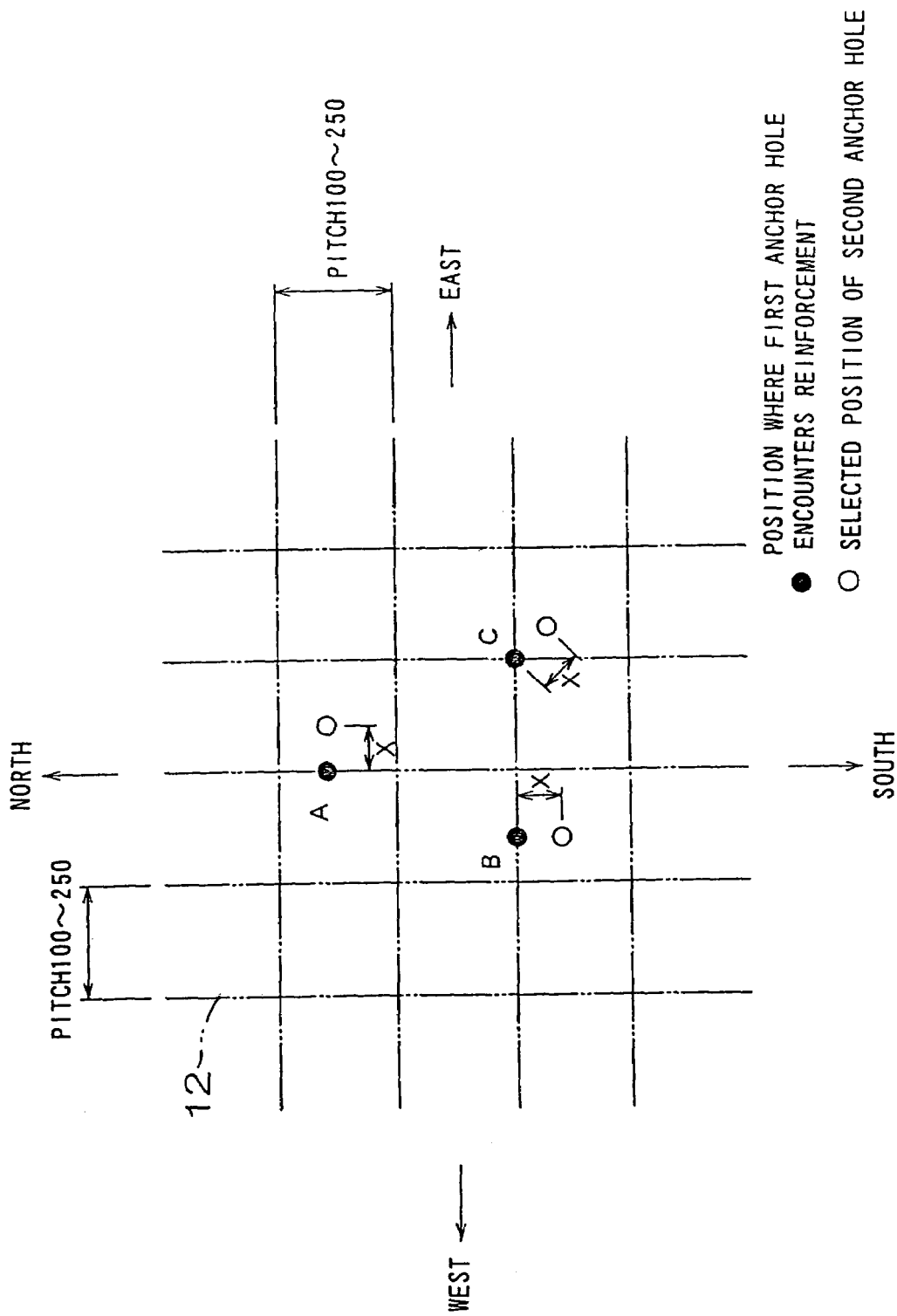
FIG. 1 is an explanatory view of an installing method of an anchor bolt according to an embodiment.

Next, an installing method of the anchor bolt according to this embodiment will be explained. FIG. 8 to FIG. 11 show the installing method of the anchor bolt in sequence. Note that the case where the anchor bolt is later installed to the concrete floor surface shown in FIG. 1 will be explained as an example.

First, the first anchor hole 10 is bored at a predetermined installation position of the anchor bolt. Incidentally, when the first anchor hole 10 does not encounter the reinforcement 12, an anchor bolt 18 in general use (refer to FIG. 12) may be used as it is. When, on the other hand, the first anchor hole 10 encounters the reinforcement 12, the arrangement direction of the encountered reinforcement 12 is found by peering from the bottom portion of the first anchor hole 10. Specifically, it is discriminated whether (A) the reinforcement 12 arranged in a north-south direction is encountered, (B) the reinforcement 12 arranged in an east-west direction is encountered, or (C) a portion where the reinforcements 12 arranged in the east-west direction and the north-south direction cross each other (refer to FIG. 1) is encountered.

Next, the boring position of the second anchor hole 11 is so decided that it does not encounter the reinforcement 12. First, it is determined in which direction from the first anchor hole 10 the second anchor hole 11 is to be bored. This direction is selected from the directions other than the arrangement direction of the reinforcement 12 found as described above. Namely, the east-west direction is selected in the A pattern, the north-south direction in the B pattern, a north-east direction, a north-west direction, a south-east direction, or a south-west direction in the C pattern, respectively. Next, it is decided at which distance from the first anchor hole 10 the second anchor hole 11 is to be bored. This distance X may be any as long as it is equal to or shorter than the pitch of the reinforcements 12 arranged on a grid. Note that the distance X is, for example, about 30 mm to about 150 mm when the pitch between the reinforcements 12 is about 100 mm to about 250 mm. The installation position of the second anchor hole 11 is decided in this manner so that the encounter of the second anchor hole 11 with the reinforcement 12 is prevented. Therefore, the second anchor hole 11 can be bored to a predetermined depth long enough to secure the pull-out strength of the anchor bolt according to this embodiment.

Figure 8:
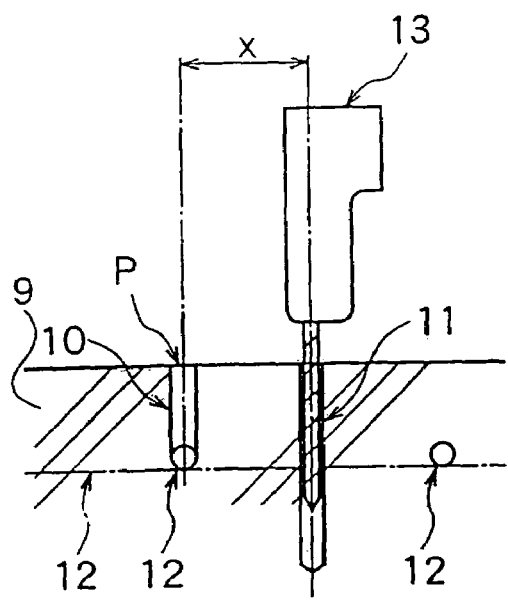
FIG. 8 is a first explanatory view of the installing method of the anchor bolt according to the embodiment.

Then, as shown in FIG. 8, the second anchor hole 11 is bored using a vibration drill 13. At this time, it is convenient if a marking line as described below is written on the surface of the concrete frame 9. Namely, a straight line is written in a direction toward the boring position of the second anchor hole 11 with an installation point P of the first anchor hole 10 as a starting point. Further, a circle having a radius X is written with respect to the installation position P. In this way, the boring position of the second anchor hole 11 can be found as a crossing point of both of the straight line and the circle.

Figure 9:
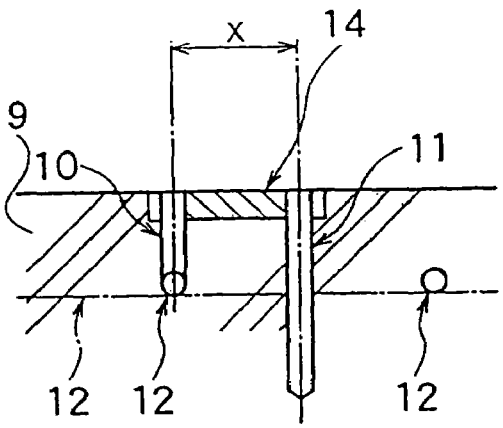
FIG. 9 is a second explanatory view of the installing method of the anchor bolt according to the embodiment.

Next, as shown in FIG. 9, a groove 14 in which the coupling member 5 is to be fitted is formed between the first anchor hole 10 and the second anchor hole 11. Specifically, the surface of the concrete frame 9 is shaved with a disk sander provided with a diamond cutter and the vibration drill 13 to form the groove 14. Next, powder dust of concrete remaining on the surfaces of the first anchor hole 10, the second anchor hole 11, and the groove 14 is cleaned away for removal with a brush or the like.

Figure 10:
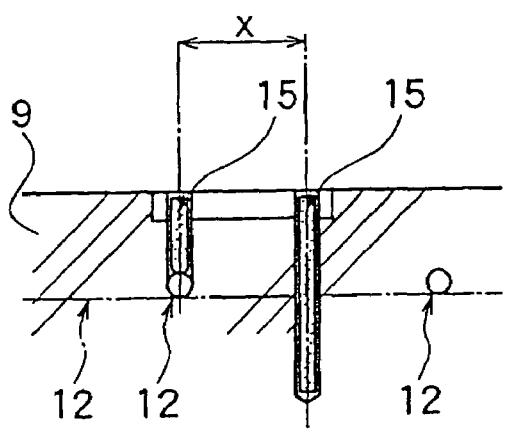
FIG. 10 is a third explanatory view of the installing method of the anchor bolt according to the embodiment.

Next, as shown in FIG. 10, an adhesive capsule 15, is inserted into each of the first anchor hole 10 and the second anchor hole 11. Incidentally, due to the asymmetric shape of the anchor bolt 1 according to this embodiment, it is not possible to stir the adhesive while destructing the capsule 15 by screwing the anchor bolt 1 into each of the anchor holes 10, 11. So, such a method is adopted that the anchor bolt 1 is driven by a hammer to mix the adhesive while destructing the capsule 15. Therefore, the capsule 15 filled with an adhesive appropriate for this hammer driving method (for example, an MU anchor (a brand name)) is inserted into each of the anchor holes 10, 11. Incidentally, such a method is also adoptable that the adhesive is injected into each of the anchor holes 10, 11 with an injection gun.

Figure 11:
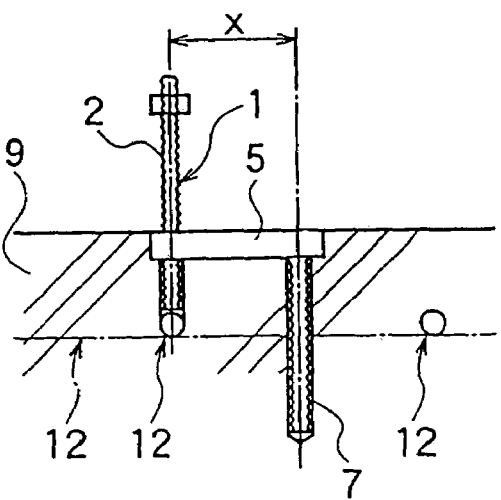
FIG. 11 is a fourth explanatory view of the installing method of the anchor bolt according to the embodiment.

Next, as shown in FIG. 11, the anchor bolt 1 according to this embodiment is inserted into each of the anchor holes 10, 11. Specifically, the embedded portion 3 of the first anchor bolt 2 is inserted into the first anchor hole 10, the second anchor bolt 7 is inserted into the second anchor hole 11, and the coupling member 5 is fitted into the groove 14. Note that, when the length of the embedded portion 3 of the first anchor bolt 2 is longer than the depth of the first anchor hole 10 encountering the reinforcement 12, a tip of the embedded portion 3 is cut to adjust the length thereof. Further, when the first anchor bolt 2 is screwed to the coupling member 5, the length of the embedded portion 3 is adjusted according to the depth of the first anchor hole 10. Then, a gap between the coupling member 5 and the groove 14 is caulked and the adhesive is matured and cured so that the installation of the anchor bolt 1 according to this embodiment is finished.

Figure 12:
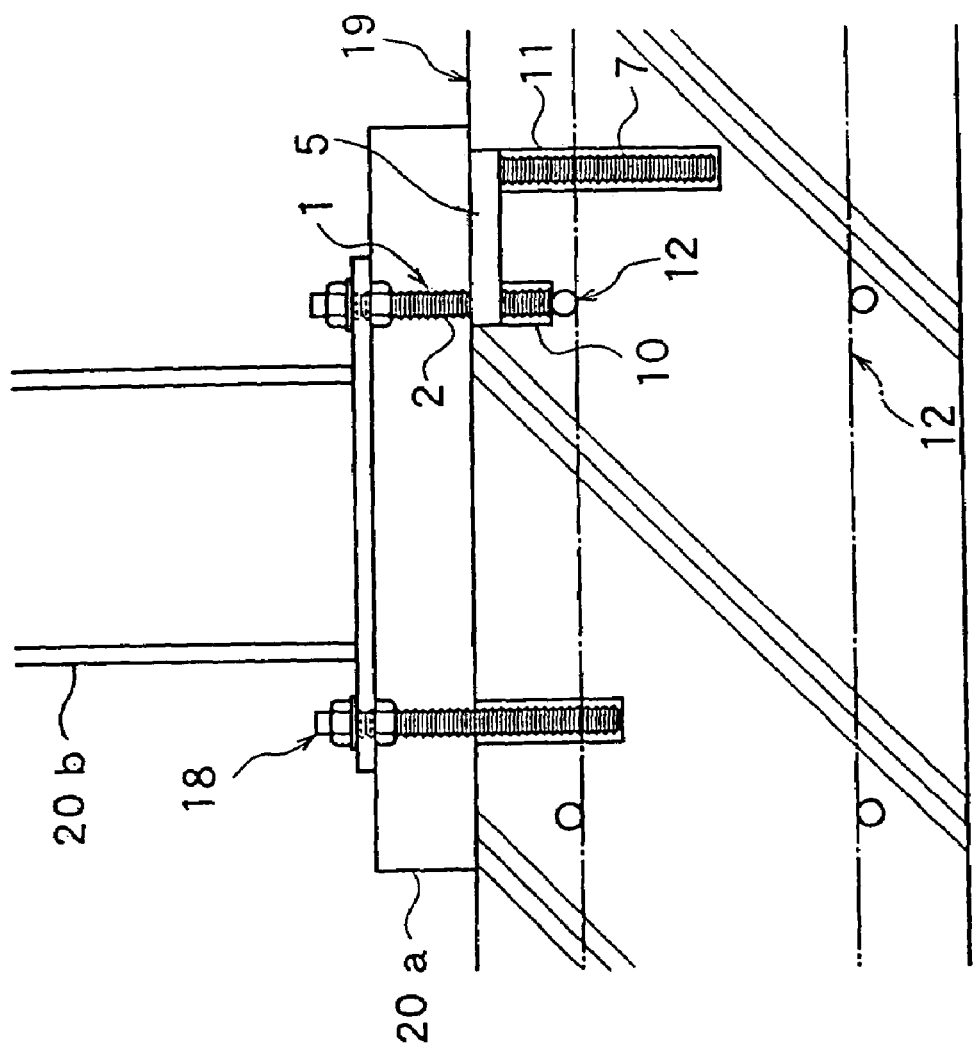
FIG. 12 is a side sectional view showing a usage example of the anchor bolt according to the embodiment when it is installed in a concrete floor surface.

FIG. 12 is a usage example of the anchor bolt 1 according to this embodiment when it is installed in a concrete floor surface 19. The anchor bolt 1 according to this embodiment besides the anchor bolt 18 in general use is installed in the concrete floor surface 19. In this installation example, a supporting portion 20a for having an H steel 20b stand on the concrete floor surface 19 is supported by an anchor bolt. Through holes corresponding to the installation positions of the respective anchor bolts 1, 18 are provided in the support portion 20a and the H steel 20b. Next, the support portion 20a and the H steel 20b are arranged on the concrete floor surface 19 while having the anchor bolts 1, 18 inserted into these through holes respectively. Then, a nut is fastened to each of the anchor bolts 1, 18 to attach the support portion 20a and the H-steel 20b. In this way, the H steel 20b is fixed to the concrete floor surface 19.

FIG. 13 is a usage example of the anchor bolt 1 according to this embodiment when it is installed in a concrete wall surface. In FIG. 13, a support angle 17 is arranged on a concrete wall surface 16 to install each of the anchor bolts 1, 18. Further, a not-shown structure member is attached to the support angle 17. In this way, the structure member is fixed to the concrete wall surface 16.

As is detailed hitherto, the anchor bolt 1 according to this embodiment is so structured to include the first anchor bolt 2 having the embedded portion shorter than the reinforcement covering margin, the second anchor bolt 7 having an axis at the position deflected from the axis of the first anchor bolt 2, and the coupling member 5 integrally fixing the first anchor bolt 2 and the second anchor bolt 7. In this case, the embedded portion 3 of the first anchor bolt 2 is inserted into the anchor hole 10 encountering the reinforcement 12 to enable the arrangement of the fixing screw portion 4 at the anchor bolt installation position. This makes it possible to install the anchor bolt 1 without any change in the installation position thereof. Further, the second anchor hole 11 is bored in the vicinity of the anchor hole 10 encountering the reinforcement 12 and the embedded portion 8 of the second anchor bolt 7 is inserted into this second anchor hole 11 so that the embedded length can be secured. This makes it possible to secure the pull-out strength of the anchor bolt 1.

Further, the installing method of the anchor bolt according to this embodiment is so structured that, when the first anchor hole 10 bored at the anchor bolt installation position encounters the reinforcement 12, the second anchor hole 11 is bored at a position in the direction other than the arrangement direction of the encountered reinforcement 12 so that the anchor bolt 1 according to this embodiment is installed. This prevents the second anchor hole 11 from encountering the reinforcement. Consequently, the second anchor hole 11 can be bored to a predetermined depth long enough to secure the pull-out strength of the anchor bolt 1 according to this embodiment.

The above-described structure eliminates the necessity of conventional slanted driving of the anchor bolt and base repairing work, so that even an unskilled worker can easily install the anchor bolt, thereby enabling the enhancement of the installation quality.

Figure 14:
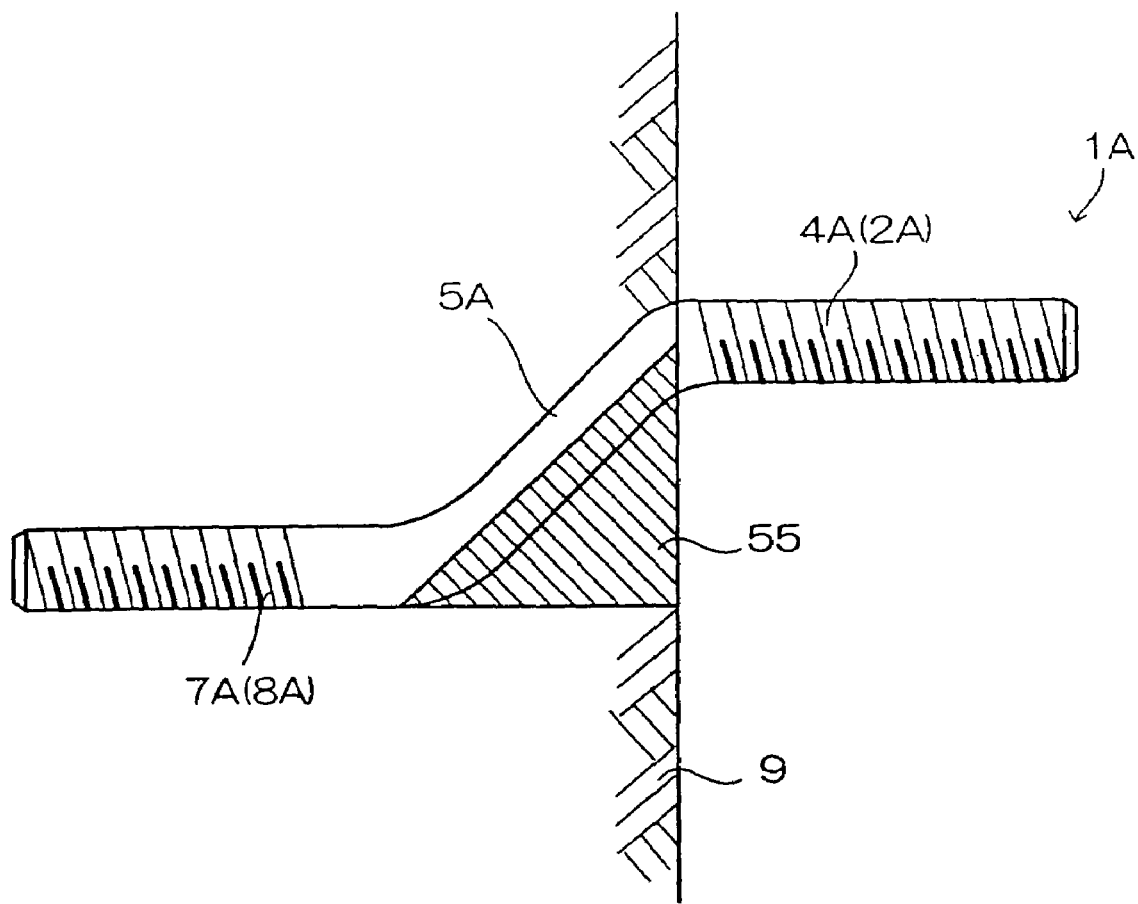
FIG. 14 is a cross sectional view of an anchor bolt according to a second embodiment when it is installed.
Figure 15:
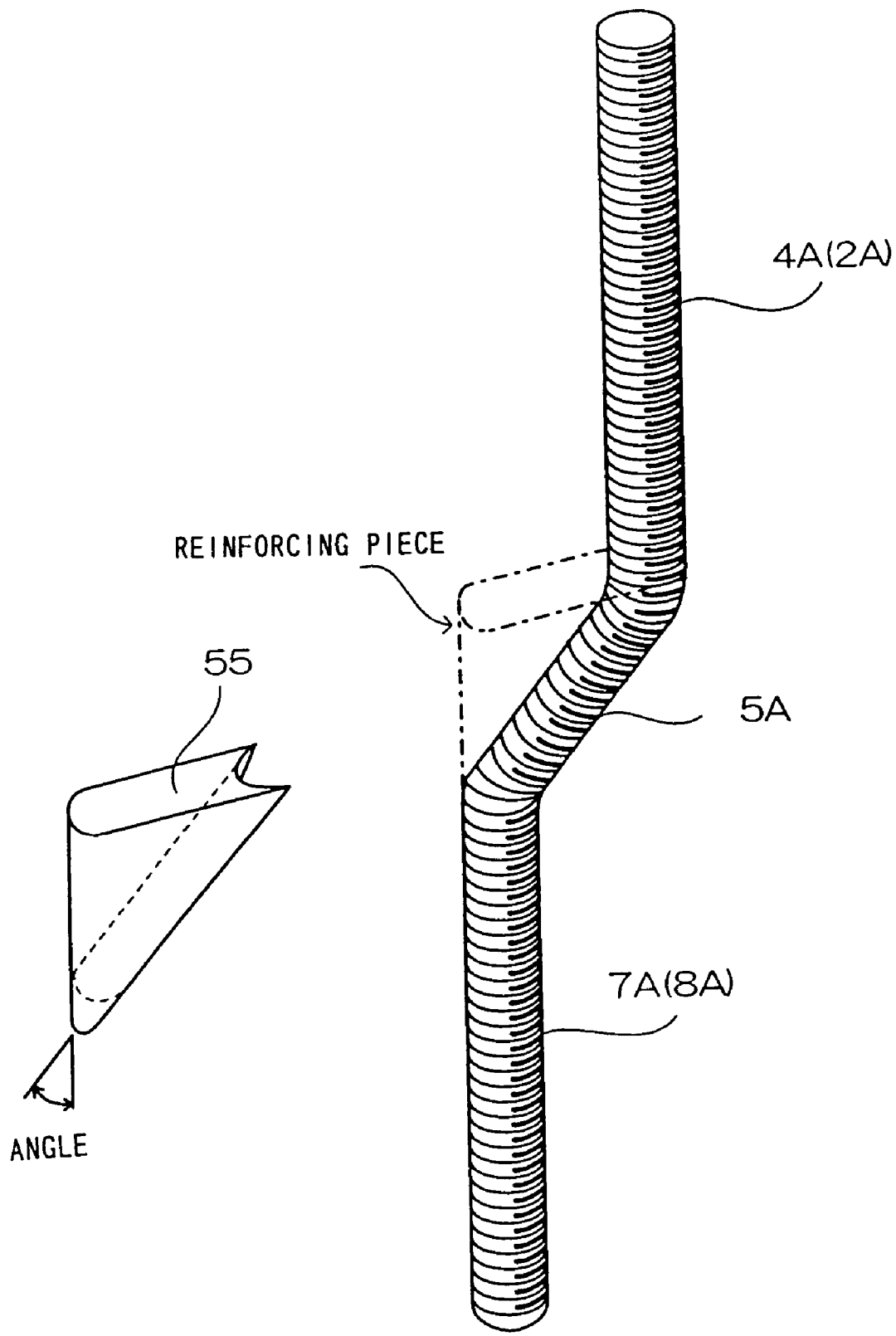
FIG. 15 is an exploded perspective view of the anchor bolt according to the second embodiment.

FIG. 14 shows an installation example of an anchor bolt 1A according to a second embodiment. This anchor bolt 1A, which is formed by bending one bolt shaft, is so structured that a fixing shaft portion 4A (a first anchor bolt 2A) protrudingly installed outside the concrete frame 9 and an embedded portion 8A (a second anchor bolt 7A) embeddedly installed inside the concrete frame 9 are formed in a bent shape, so that the axis of the fixing shaft portion 4A and the axis of the embedded portion 8A are deflected from each other by a distance X while being set in parallel to each other. The bending angle of a bent portion 5A corresponding to the aforesaid coupling member 5 is preferably set at 45 degrees to 60 degrees relative to the axis of the fixing shaft portion 4A or the axis of the embedded portion 7A. Further, in this embodiment, a reinforcing piece 55 is attached to the bent portion 5A to secure the strength thereof. As shown in FIG. 15, the reinforcing piece 55 is a member formed of a right triangle material, which is formed separately from the anchor bolt, and is so structured that a fitting groove is formed in its hypotenuse portion to have the bent portion 5A fitted therein. The reinforcing piece 55 is integrally welded to the bent portion 5A of the anchor bolt 1A which is formed by bending the bolt shaft as described above. This can enhance the proof strength against the load given to the bent portion 8A.

Figure 16:
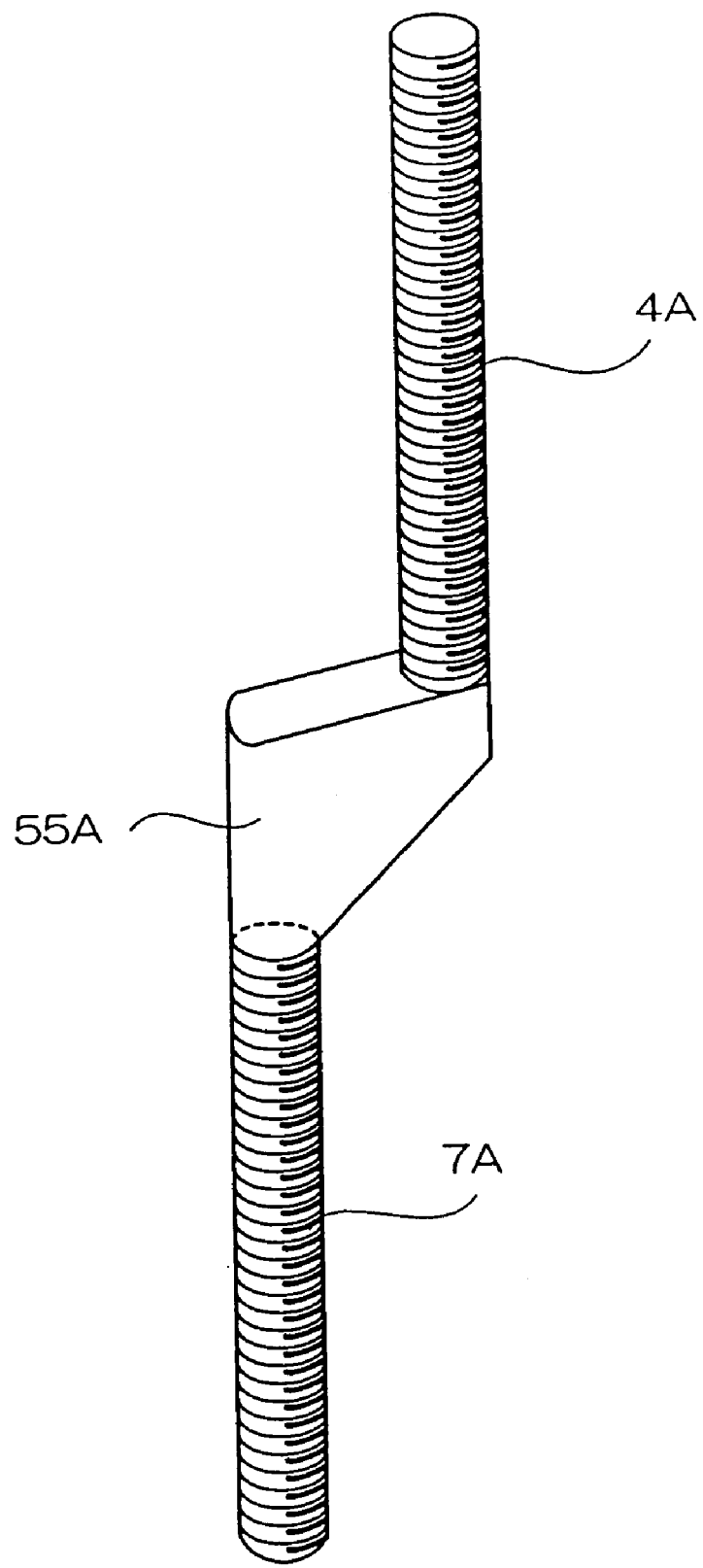
FIG. 16 is a perspective view showing another modification example of the anchor bolt according to the second embodiment.

In FIG. 16, instead of separately forming the reinforcing piece 55, the fixing shaft portion 4A formed of a screw shaft and the embedded portion 8A are integrally welded to a reinforcing piece 55A which is formed of a substantially right triangle material. This structure does not require the bending formation of the screw shaft and accordingly simplifies the production.

Figure 17:
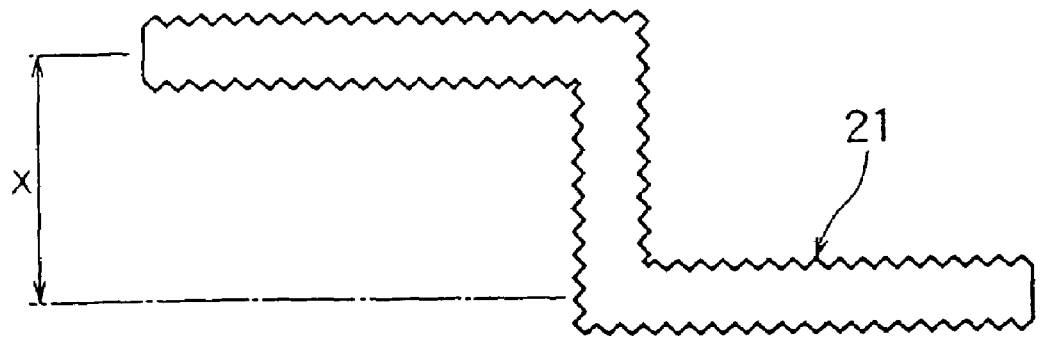
FIG. 17 is a side sectional view of an anchor bolt according to a third embodiment.
Figure 18:
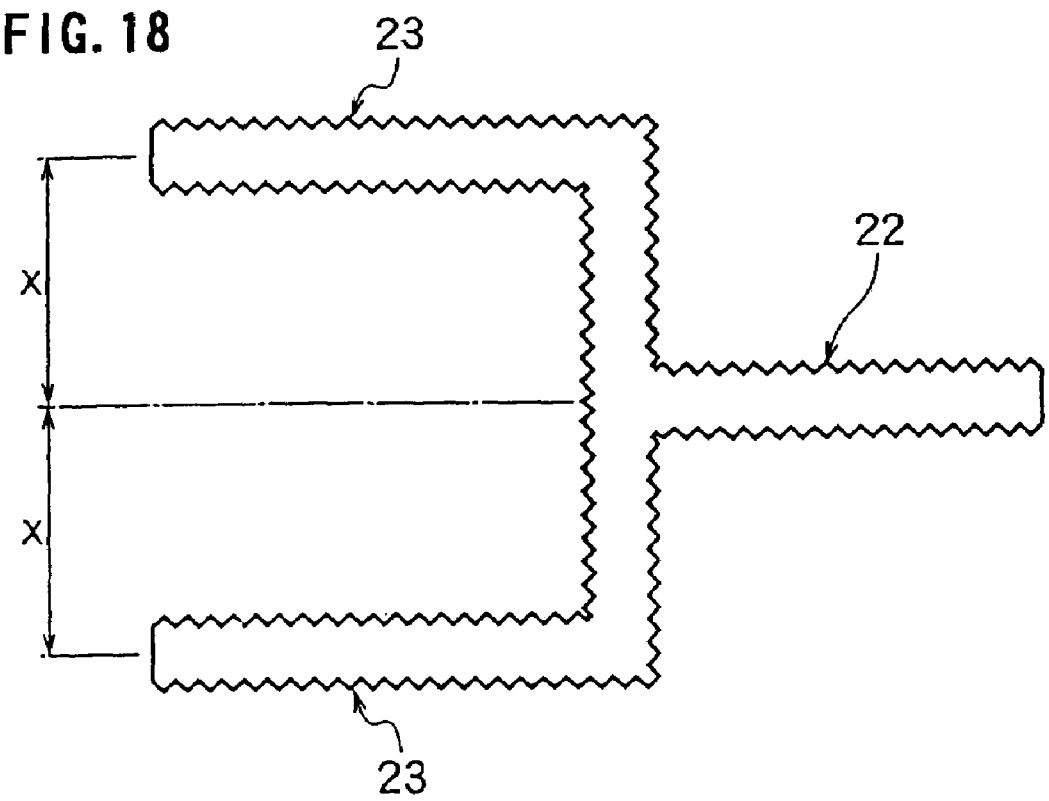
FIG. 18 is a side sectional view of an anchor bolt according to a fourth embodiment.

Incidentally, the anchor bolt according to the present invention is not limited to be in the shapes stated above, and for example, it may be so formed that the first anchor bolt, the second anchor bolt, and the coupling member are integrally formed and, in addition, a male screw 21 is formed on the entire surface of the outer periphery as shown in FIG. 17. This anchor bolt can be formed in such a manner that a bar material having the male screw 21 formed on the entire surface of the outer periphery thereof is bent. Further, as shown in FIG. 18, two anchor bolts 23 may be integrally formed, the fixing screw portion 22 protruding outside the concrete frame being therebetween, and each of the anchor bolts 23 being positioned at the distance X apart from the fixing screw portion 22. This anchor bolt can be formed in such a manner that a plurality of bar materials having a male screw formed on the outer periphery thereof are welded together.

Figure 19:
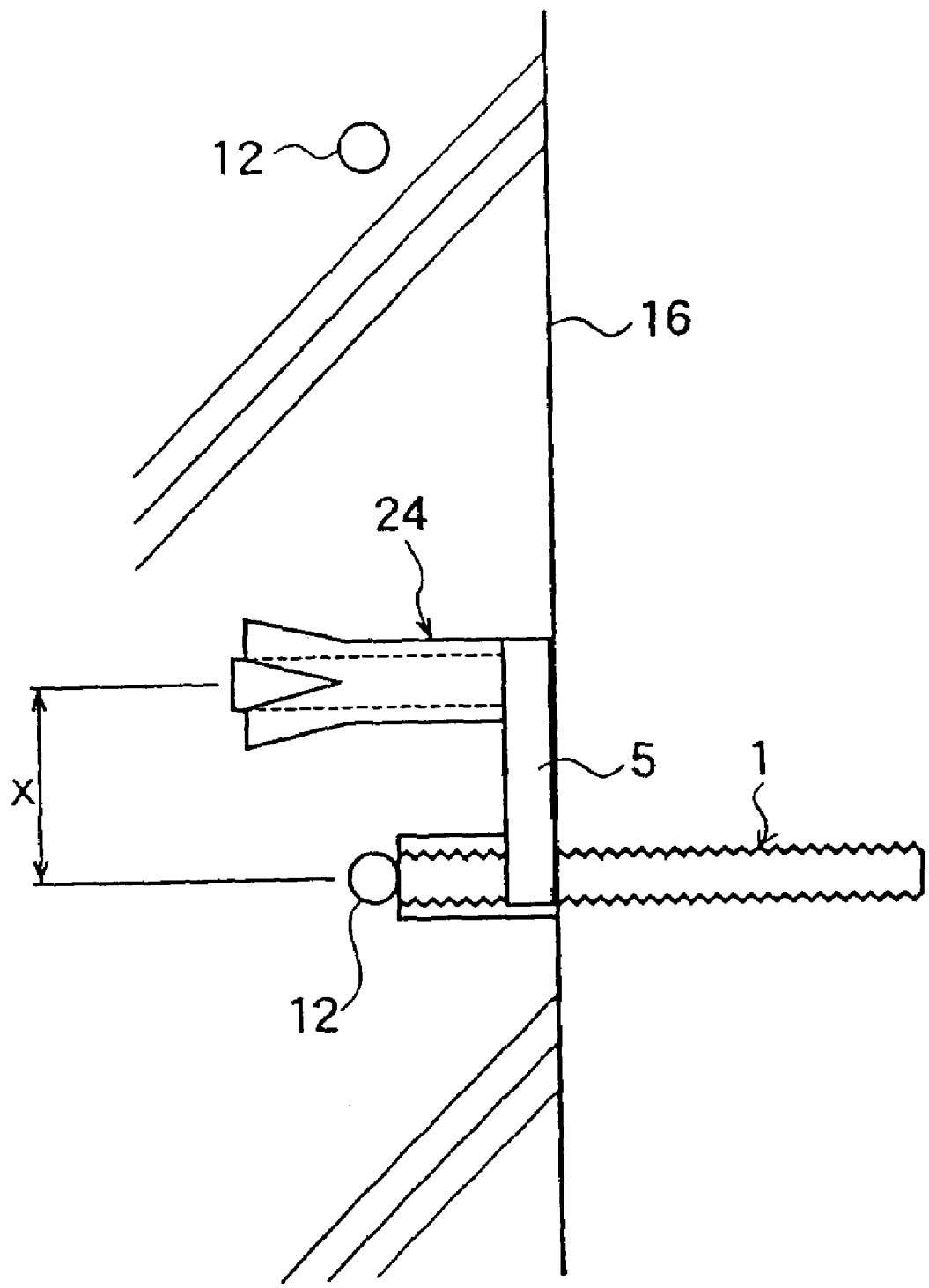
FIG. 19 is a side sectional view an anchor bolt according to a fifth embodiment.
Figure 20:
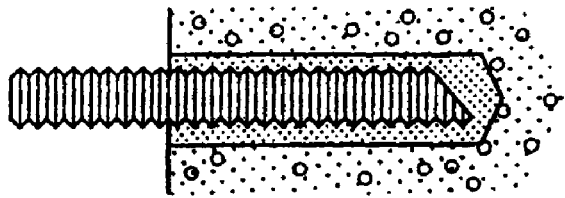
FIG. 20 is a first explanatory view of an installing method of an adhesive anchor bolt according to a conventional art.
Figure 21:
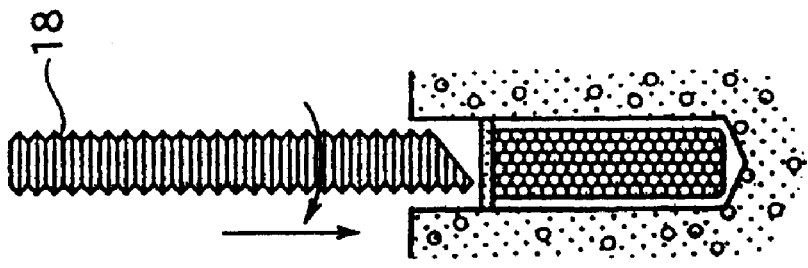
FIG. 21 is a second explanatory view of the installing method of the adhesive anchor bolt according to the conventional art.
Figure 22:
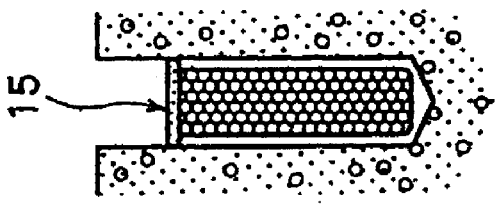
FIG. 22 is a third explanatory view of the installing method of the adhesive anchor bolt according to the conventional art.
Figure 23:
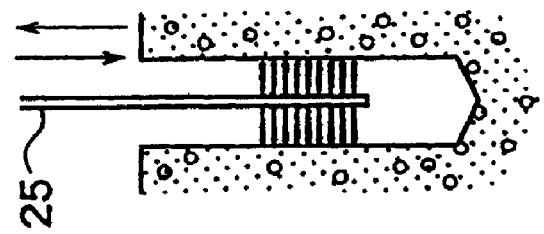
FIG. 23 is a fourth explanatory view of the installing method of the adhesive anchor bolt according to the conventional art.
Figure 24:
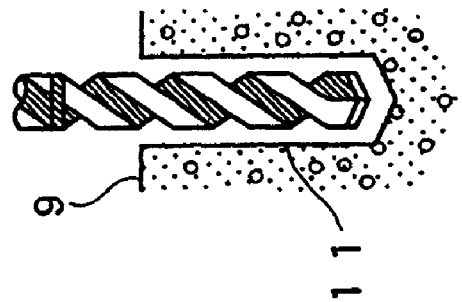
FIG. 24 is a fifth explanatory view of the installing method of the adhesive anchor bolt according to the conventional art.
Figure 25:
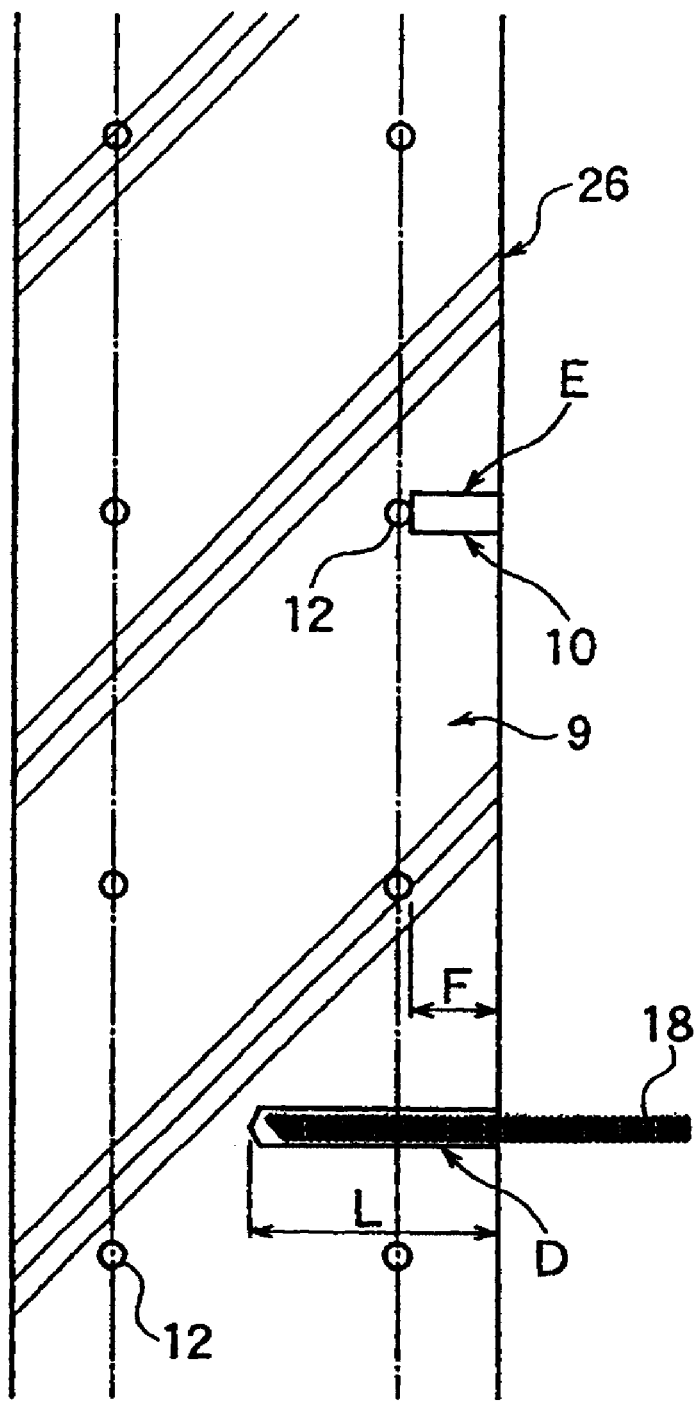
FIG. 25 is an explanatory view showing a problem of an anchor according to the conventional art.
Figure 26:
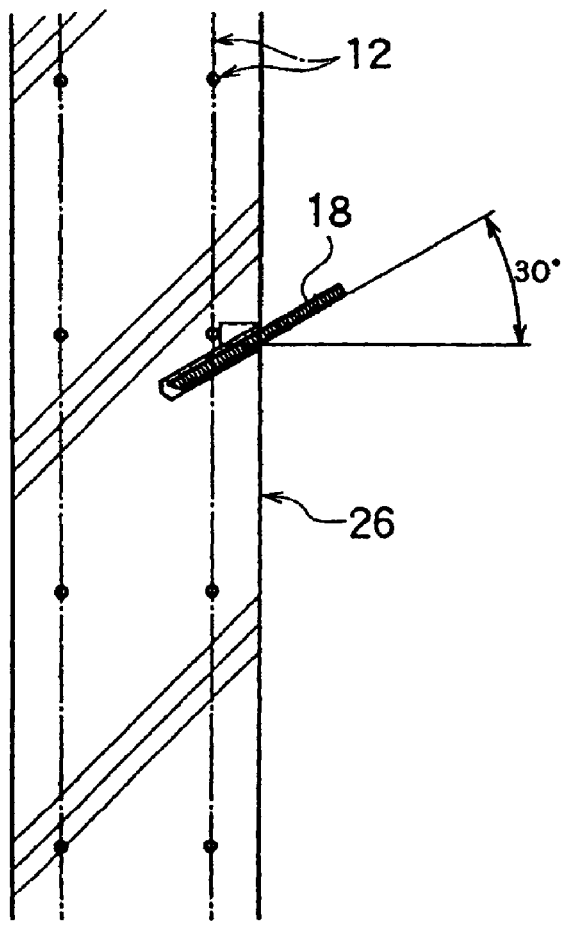
FIG. 26 is a first explanatory view of an installing method of the anchor according to the conventional art.
Figure 27:
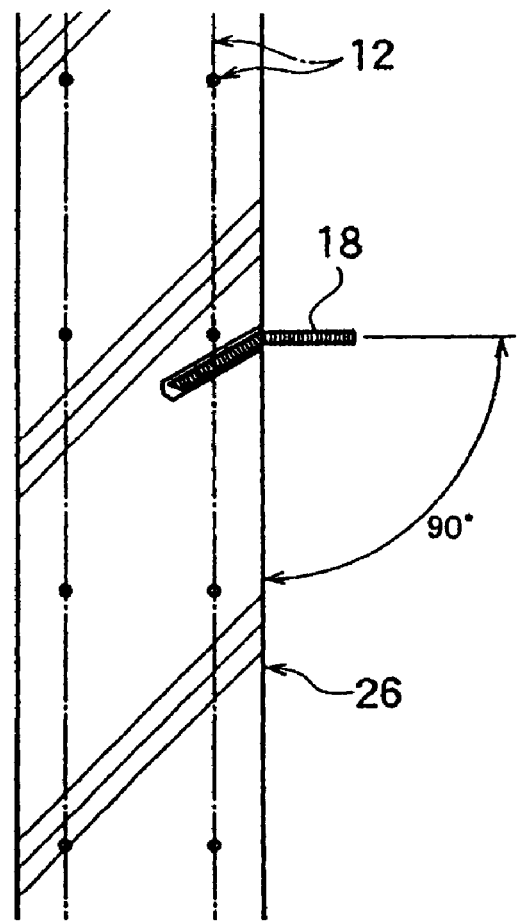
FIG. 27 is a second explanatory view of an installing method of the anchor according to the conventional art.

In the above description, the case where the first anchor bolt and the second anchor bolt are both the adhesive anchors is explained as an example, but they can be driving anchors. In FIG. 19, a side sectional view when the second anchor bolt is the driving anchor is shown. This second anchor bolt 24 can be fixed to the concrete wall surface 16 in such a manner that after it is inserted into the second anchor hole, a tip portion thereof is divided in a wedge shape. Also in this case, the anchor bolt can be installed without any change in the installation position, and the pull-out strength of the anchor bolt can be secured as well.

What is claimed is:

1. An installing method of an anchor bolt, comprising:

boring a hole into a concrete frame having a top surface and reinforcement positioned at a reinforcement covering margin depth in the concrete below the top surface, wherein the hole extends all of the way to the reinforcement at an anchor bolt installation position in the concrete frame, boring an anchor hole for receiving an embeddable portion of the anchor bolt, the anchor hole being located at a peripheral position of a position encountering this reinforcement to a depth equal to or longer than the reinforcement covering margin;

forming a groove in the concrete between said position encountering the reinforcement and said anchor hole;

embedding in said anchor hole an embeddable portion of the anchor bolt, the embeddable portion having a longitudinal axis;

accommodating a coupling member in said groove so that the coupling member is countersunk below or flush with the top surface of the concrete frame; and integrally coupling the embeddable portion to a fixing shaft portion of the anchor bolt through the coupling member, the fixing shaft portion protruding from the concrete and having a longitudinal axis which is arranged at said position encountering the reinforcement, thereby fixedly installing the anchor bolt, wherein the longitudinal axis of the embeddable portion is different from and parallel to the longitudinal axis of the fixing shaft portion.

2. An installing method of an anchor bolt comprising first and second anchor bolt portions integrally formed via a coupling member, comprising:

boring a first anchor hole into a concrete frame having a top surface and reinforcement positioned at a reinforcement covering margin depth in the concrete below the top surface, wherein the first anchor hole extends all of the way to the reinforcement at an anchor bolt installation position in the concrete frame, the first anchor hole having a longitudinal axis and a depth within the reinforcement covering margin at the position encountering this reinforcement;

boring a second anchor hole having a longitudinal axis and a depth equal to or longer than the reinforcement covering margin at a peripheral position not encountering the reinforcement;

forming a groove in the concrete frame between said first and second anchor holes; and fixedly inserting into the first and the second anchor holes embeddable portions of the first and the second anchor bolt portions, respectively, integrally formed via the coupling member, to thereby install the anchor bolt, wherein the longitudinal axis of the first anchor hole is different from and parallel to the longitudinal axis of the second anchor hole and the coupling member is accommodated in the groove so that the coupling member is countersunk below or flush with the top surface of the concrete frame.

3. An installing method of an anchor bolt comprising a first anchor bolt portion and a second anchor bolt portion connected via a coupling member, comprising:

boring a first anchor hole having a longitudinal axis into a concrete frame having a top surface and reinforcement positioned at a reinforcement covering margin depth in the concrete frame below the top surface, wherein the first anchor hole extends all of the way to the reinforcement, discriminating a position not encountering the reinforcement based on an arrangement direction of the encountered reinforcement and boring a second anchor hole having a longitudinal axis to a depth that is longer than the reinforcement covering margin;

forming a communicating groove between said first anchor hole and said second anchor hole;

embeddedly installing the first anchor bolt portion and the second anchor bolt portion in said first anchor hole and said second anchor hole respectively while accommodatingly installing in said groove the coupling member which connects the first and second anchor bolt portions; and supporting the first anchor bolt portion by the second anchor bolt portion, wherein the longitudinal axis of the first anchor hole is different from and parallel to the longitudinal axis of the second anchor hole and the coupling member is accommodated in the groove so that the coupling member is countersunk below or flush with the top surface of the concrete frame.

4. The installing method of an anchor bolt according to claim 1, wherein the longitudinal axis of the embedded portion and the longitudinal axis of the fixing shaft portion are deflected from each other by a distance X and the coupling member has a length greater than X.

5. The installing method of an anchor bolt according to claim 4, wherein the reinforcement is arranged in the concrete frame in a grid at a predetermined pitch and the distance X is equal to or shorter than the pitch.

6. The installing method of an anchor bolt according to claim 4, wherein distance X is between 30 to 150 mm.

7. The installing method of an anchor bolt according to claim 2, wherein the longitudinal axis of the first anchor hole and the longitudinal axis of the second anchor hole are deflected from each other by a distance X and the coupling member has a length greater than X.

8. The installing method of an anchor bolt according to claim 7, wherein the reinforcement is arranged in the concrete frame in a grid at a predetermined pitch and the distance X is equal to or shorter than the pitch.

9. The installing method of an anchor bolt according to claim 7, wherein distance X is between 30 to 150 mm.

10. The installing method of an anchor bolt according to claim 3, wherein the longitudinal axis of the first anchor hole and the longitudinal axis of the second anchor hole are deflected from each other by a distance X and the coupling member has a length greater than X.

11. The installing method of an anchor bolt according to claim 10, wherein the reinforcement is arranged in the concrete frame in a grid at a predetermined pitch and the distance X is equal to or shorter than the pitch.

12. The installing method of an anchor bolt according to claim 10, wherein distance X is between 30 to 150 mm.

* * * * *